US008805673B1

(12) United States Patent
Neff

(10) Patent No.: US 8,805,673 B1
(45) Date of Patent: Aug. 12, 2014

(54) SYSTEM AND METHOD FOR SHARING REGION SPECIFIC PRONUNCIATIONS OF PHRASES

(75) Inventor: Sam Neff, Novato, CA (US)

(73) Assignee: GlobalEnglish Corporation, Brisbane, CA (US)

( * ) Notice: Subject to any disclaimer, the term of this patent is extended or adjusted under 35 U.S.C. 154(b) by 228 days.

(21) Appl. No.: 13/183,285

(22) Filed: Jul. 14, 2011

(51) Int. Cl.
*G06F 17/20* (2006.01)
*G10L 21/00* (2013.01)
*G09B 19/04* (2006.01)

(52) U.S. Cl.
USPC .............................. 704/8; 704/270; 434/185

(58) Field of Classification Search
None
See application file for complete search history.

(56) References Cited

U.S. PATENT DOCUMENTS

| | | | | |
|---|---|---|---|---|
| 5,393,236 | A * | 2/1995 | Blackmer et al. | 434/169 |
| 5,766,015 | A * | 6/1998 | Shpiro | 434/156 |
| 7,407,384 | B2 * | 8/2008 | Raya et al. | 434/167 |
| 8,285,537 | B2 * | 10/2012 | Tanner et al. | 704/4 |
| 8,411,940 | B2 * | 4/2013 | Dauw et al. | 382/162 |
| 2004/0054534 | A1 * | 3/2004 | Junqua | 704/258 |
| 2007/0255570 | A1 * | 11/2007 | Annaz et al. | 704/270 |
| 2008/0082316 | A1 * | 4/2008 | Tsui et al. | 704/4 |
| 2008/0208574 | A1 * | 8/2008 | Chen et al. | 704/221 |
| 2009/0305203 | A1 * | 12/2009 | Okumura et al. | 434/185 |

* cited by examiner

*Primary Examiner* — Brian Albertalli
(74) *Attorney, Agent, or Firm* — Aka Chan LLP

(57) ABSTRACT

Systems and methods include transmitting from a server to a client device a list of common phrases of a language and voice recordings associated with each of the phrase, wherein voice recordings provide region-specific pronunciations of the phrases. Users at the client device can search over communication network for common phrases and listen to how certain phrases of a language are spoken in different regions of the world. The users at the client device can also upload to the server their own voice recordings of phrases in their own region-specific pronunciations. Using the present systems and methods, the users can familiarize themselves with how a particular language, such as English, is spoken in different regions of the world prior to their international travel or business meeting.

28 Claims, 9 Drawing Sheets

SYSTEM AND METHOD FOR SHARING REGION SPECIFIC PRONUNCIATIONS OF PHRASES

BACKGROUND OF THE INVENTION

This invention relates to the field of technologies for providing and sharing region-specific pronunciations of phrases of a language.

English is often spoken as a universal language around the world. However, people from different regions of the world speak English with their own unique accent and intonation. The pronunciations of English phrases by non-native speakers are influenced by sounds of their native language. For example, the Japanese language does not have sounds that are equivalent to English alphabets "l" and "r." Thus, Japanese often substitute sounds of these letters with similar sounds in their own language. As a result, their English speech pattern is distinct and different from those of native English speakers or from other non-native speakers from different regions of the world.

When a person travels to a country where English is not its primary language, it can be difficult for the traveler to comprehend English spoken by a non-native speaker when the traveler is not accustomed to listening to accented English spoken by those in the country. This can result in a miscommunication. Furthermore, it can be embarrassing or awkward for a listener or speaker, if the listener cannot fully comprehend English spoken by a non-native speaker, particularly in a business setting. Thus, it would be desirable for people to familiarize themselves with accented speech patterns of others from a country or region of interest to improve overall comprehension and quality of conversation. It would also instill confidence for the person travelling to a new country or when conducting business with, for example, non-native English speakers.

Thus, there is a need for new and improved techniques for providing and sharing country or region-specific pronunciation of English (or any other languages) so that people in this global community can communicate better and enhance the quality of conversation with one another.

BRIEF SUMMARY OF THE INVENTION

The present invention relates to systems and methods for providing region-specific pronunciations of phrases of a language. According to one aspect of the invention, a database of a system includes a list of common phrases in a language and users' voice recordings of the phrases in their own region-specific pronunciations. The database includes a map or list of regions (e.g., countries) from which region-specific pronunciations of phrases are available. For example, the language may be English, and the database may include voice recordings of users who live in India, China, Japan, Singapore, France, Italy, and others. Each voice recording is associated with a region that the user (i.e., a speaker) is native of and the gender of the user (i.e., male or female).

In another aspect of the invention, a method includes a way that a server provides information to a client device. The server storage contains audio data representing voice recordings of users (i.e., speakers) from different regions of the world, where the user speak a language (e.g., English) with his or her region-specific accent. The server receives a request from a client device to view first content containing regions of the world available, and the server transmits the first content to the client device. The server receives a request from the client to view second content containing a list of phrases and voice recordings associated with each of the phrases, for a region selected by a user at the client device. The server transmits the second content requested by the user to the client device.

In one embodiment, the first content contains the regions of the world in the form of a map or a list.

In another embodiment, the first content comprises an input field which allows the user to input and search a phrase that the user desires to listen to.

In yet another embodiment, the regions are countries where their primary language is not English.

In yet another embodiment, the voice recordings include either a male voice or a female voice and the user may provide in an input field to select to either voice.

In another aspect of the invention, a method includes a way for a client device to request information from a server. The client device receives first containing regions of the world. The client device receives and transmits to the server a user selection of a region from the regions of the world. The user desires to listen to the region-specific pronunciations of phrases of a language associated with that region. The client device receives from the server second content containing a list of phrases and voice recordings corresponding to each of the phrases. The voice recordings contain region-specific pronunciations of the phrases of the region selected by the user. The client device may generate an output of a voice recording (i.e., play an audio data) of the phrase selected by the user from the list of phrases.

In one embodiment, the voice recording of the phrase selected by the user can be downloaded and stored in the client device.

In another embodiment, the client device is a smartphone, a PDA, or a portable computer.

In yet another aspect of the invention, a method includes a way for a server to receive voice recordings from a client device. Some users, particularly those who may not be native English speakers, may wish to provide their own voice recordings to a server to assist others in better comprehend region-specific pronunciation of a language. The server receives a request from a client device to view first content containing regions of the world. The server also receives a request from the client device to view second content containing a list of phrases of which region-specific pronunciations of the phrases is desired in the server. The server transmits the first content and the second content to the client device, either sequentially or simultaneously. The server then receives a user selection of a phrase, the user's voice recording of the phrase, and data relating to the region from which the user is a native from the client device.

In yet another aspect of the invention, a method includes a way that a client device requests transmits audio data representing voice recordings to a server. The client device receives from the server first content containing regions of the world. The client device also receives from the server second content containing a list of phrases of which region-specific pronunciations of the phrases of the language is desired. The client device receives a user selection of a region that the user desires to provide the region-specific pronunciations of the phrases. The client device also receives a user selection of a phrase and the user's voice recording of the phrase in the region-specific pronunciation. The client device transmits the user selection of the phrase, the user's voice recordings of the phrase, and the region from which the user is a native to the server.

In yet another aspect of the invention, a system includes a data memory operable to store data to be processed, an instruction memory storing processor implementable instructions, and a processor operable to read and process the data in accordance with instructions stored in the instruction memory. In the system, the instructions stored in the instruction memory include instructions for controlling the processor to perform any methods described above.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
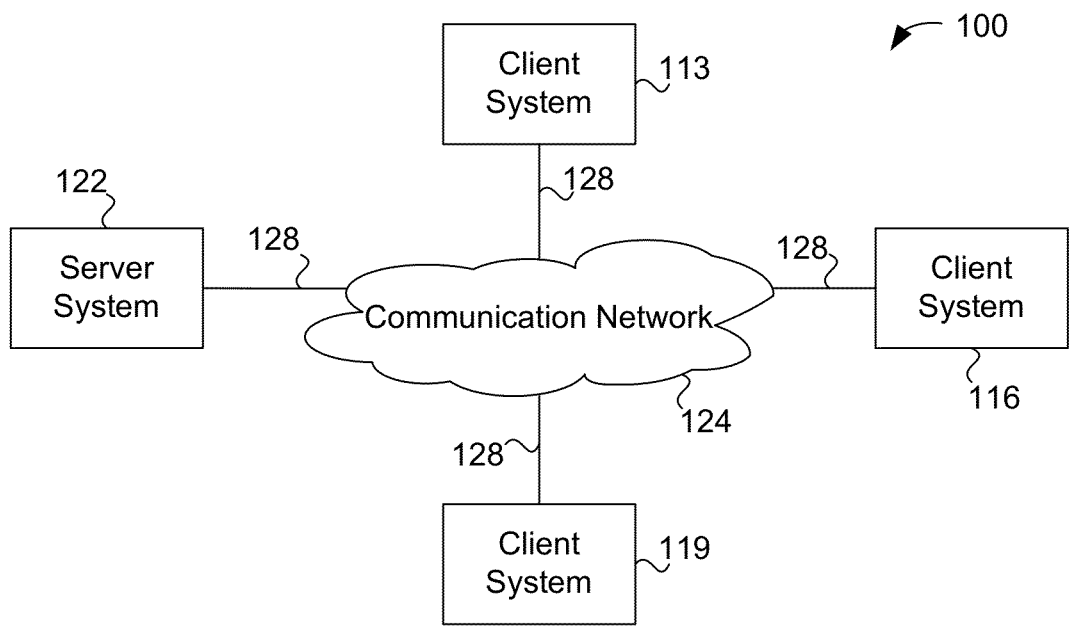
FIG. 1 shows a simplified block diagram of a client-server system and network in which an embodiment of the invention may be implemented.

As the world is becoming more globalized, it is important that people from various countries, speaking different languages, can communicate effectively with one another. English is often spoken among people from various countries as a communication medium, particularly during international business meetings. However, it can be difficult to understand English spoken by a foreign national who is not a native English speaker. When English is learned as a second language later in life, the person's speech in the second language is often accented, being influenced by sounds of the person's native language. This can result in a miscommunication or cause embarrassment or awkwardness for listeners as well as speakers during an international travel or in a business meeting.

Systems and methods in accordance with the present invention provide means for people to familiarize themselves as to how a particular language, e.g., English, is spoken in different regions of the world. For example, native Japanese often speak English with a distinct accent and intonation that differs from native Indians or Chinese. Prior to an international travel or a business meeting, people can become acquainted and become more comfortable in understanding the speech of English (or other languages) spoken by people from different regions of the world.

According to one aspect of the invention, a system includes a database which has voice recordings of common phrases of a language, where voice recordings are provided by people from different regions of the world. The voice recordings are stored in a way that can be searched and retrieved, using Internet, by others who wish to listen to region-specific pronunciations of certain phrases. For example, phrases and voice recordings associated with the phrases can be searched based on a category of phrases (e.g., phrases commonly used in travel, business meeting, restaurants, and others) or based on key words. Through a communication network, the server may be connected to a client device, such as computer, a smartphone, a PDA, and other personal electronic devices to transmit information between the server and the client device.

In a specific implementation, some aspects of the invention are implemented at a Web site which is built for the purpose of social networking or learning English, or both. For example, the Web site may be EnglishCafe which serves a community focused on English learning. Anyone from all over the world can join EnglishCafe as members. The members of EnglishCafe may save their voice recordings of common English phrases and upload their audio files as well as their other identifying information (e.g., regions of the world from which members are from) to the EnglishCafe server. The members of EnglishCafe who desire to familiarize themselves with a way others speak English in certain regions can retrieve voice recordings of other members from the EnglishCafe Web site.

The term "phrase" is used in this application to refer to a word, a group of words, or a sentence.

The term "content" is used in this application to refer to any material which may be communicated over a communication network. The content may include a Web content or a Web page. There may be one or multiple contents which may be presented in a Web page by a browser application. For example, a list of regions in a drop down menu on a Web page may represent first content, and a search phrase box may represent second content which may be shown on the same Web page as the list of regions.

The term "region" is used in this application to refer to any country, a location within a country, or any confined geographical area. The term "region-specific pronunciations of phrases" refers to a general pattern of speech that is specific and distinct to a particular region of the world. For example, a region-specific pronunciations of English phrases in Japan can be an accented speech pattern of native Japanese that is particular and specific to Japanese. In another example, region-specific pronunciations of English phrases can refer to how natives of United States speak English in certain regions (e.g., in New York versus southern states).

While English is often used as an example of a global language, embodiments of the present invention are not limited to English. Languages other than English are used as means to communicate among people from different countries. While English is often described as an example of a language for providing region-specific pronunciations of common phrases in this application, various aspects of the invention can be applied to any other languages (e.g., Mandarin, Cantonese, Japanese, French, German, or others).

Embodiments of the invention provide many advantages. Listening to region-specific pronunciations of phrases will allow people to gain confidence when they travel internationally or in conducting business with others living in a particular region of the world. People can communicate with one another more effectively. Also, through Internet and Web sites such as EnglishCafe, members can find other members who contributed to voice recordings to the Web site and can communicate with one another to obtain additional information regarding region-specific customs, etiquettes, or recommendations for restaurants or local attractions.

Examples of embodiments of the invention are illustrated using figures and are described below. The figures described herein are used to illustrate embodiments of the invention, and are not in any way intended to be restrictive of the broad invention. Embodiments of the invention are not limited to the specific arrangements and constructions shown and described. For example, features shown in one figure can be combined with features shown in another figure.

FIG. 1 is a simplified block diagram of a distributed computer network 100 incorporating an embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client and a server depending on whether the computer system is requesting or providing information. Additionally, although aspects of the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

According to the teachings of the present invention, client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser program (e.g., versions 6.0 and 7.0) provided by Microsoft Corporation, the Firefox browser provided by Mozilla, the Safari browser and Mobile Safari browser provided by Apple Corporation, and others.

Figure 2:
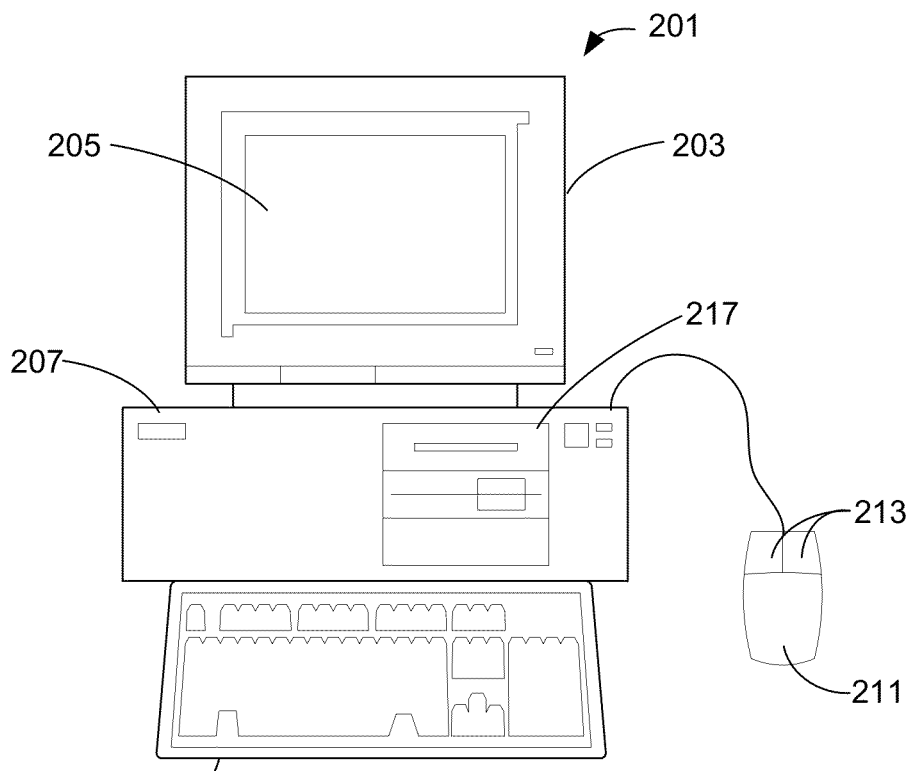
FIG. 2 shows a more detailed diagram of an exemplary client or computer which may be used in an implementation of the invention.

FIG. 2 shows an exemplary client system (or server system) of the present invention. In an embodiment, a user interfaces with the system through a computer workstation system, such as shown in FIG. 2. FIG. 2 shows a computer system 201 that includes a monitor (e.g., color monitor) 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other non-volatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM (e.g., 128 megabytes). Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
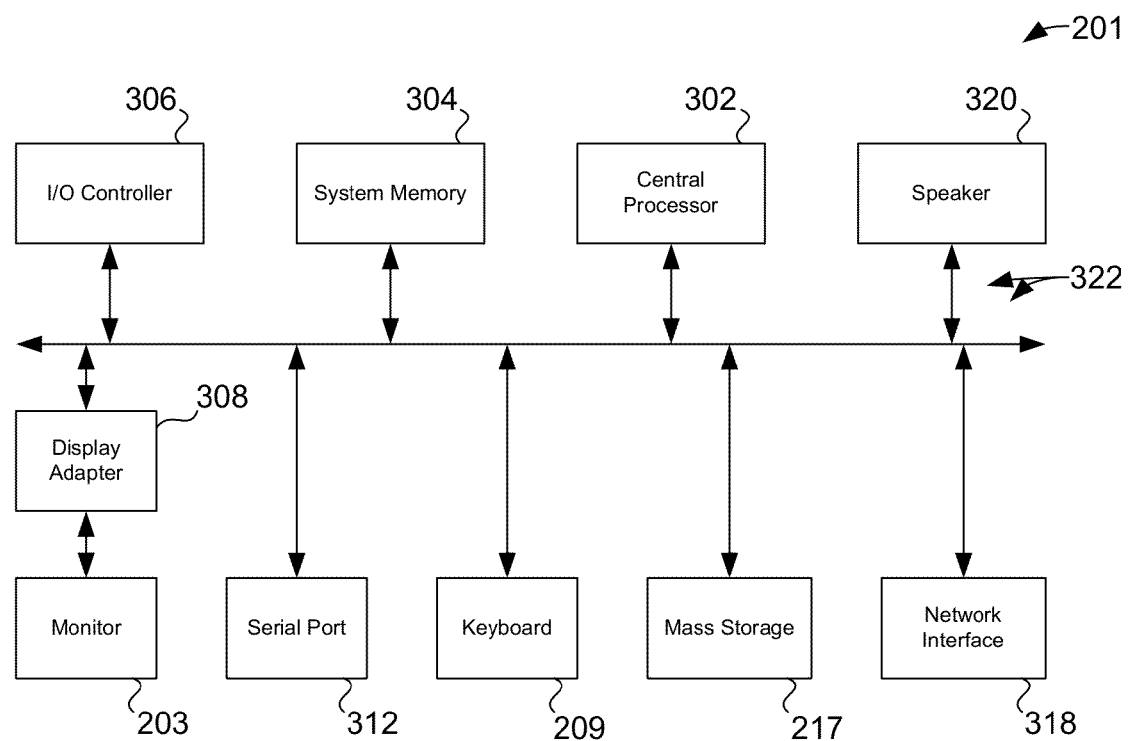
FIG. 3 shows a system block diagram of a client computer system used to execute application programs such as a web browser.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows, 8, Windows CE, Windows Mobile), Linux, HP-UX, UNIX, Sun OS, Solaris, Mac OS X, Apple iOS, Google Android, Alpha OS, AIX, IRIX32, or IRIX64. Other operating systems may be used. Microsoft Windows is a trademark of Microsoft Corporation. The computer may include any number of installed drivers such as audio drivers.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples), near field communication (NFC), radio-frequency identification (RFID), mobile or cellular wireless (e.g., 2G, 3G, 4G, 3GPP LTE, WiMAX, LTE, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computer.

In an embodiment, with a web browser executing on a computer workstation system, a user accesses a system on the World Wide Web (WWW) through a network such as the Internet. The web browser is used to download Web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web. The web browser may include any number of various plug-ins such as plug-ins for playing audio information.

Figure 4:
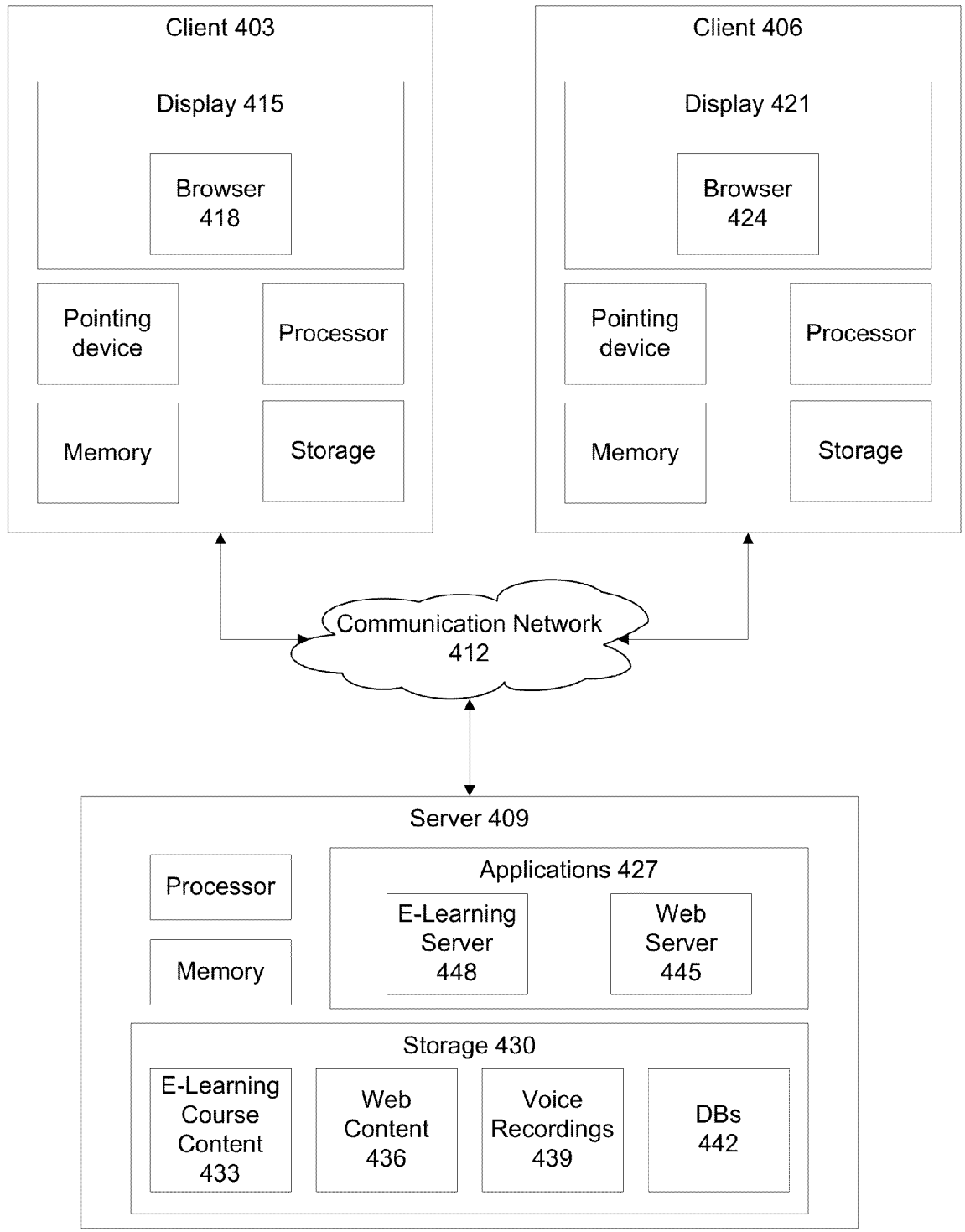
FIG. 4 shows a block diagram of a specific implementation of a system of the invention.

FIG. 4 shows a block diagram of a specific implementation of a system of the invention. This system includes any number of clients (i.e., client devices) such as first and second clients 403 and 406 which access a server 409 via a communication network 412. The communication network is as shown in FIG. 1 and described above.

The clients may be general purpose computers with hardware and software, such as shown in FIGS. 2-3 and described above. The clients include one or more hardware and software components described. For example, the first client includes a first display 415, a first application program 418 (e.g., first browser application program), a pointing device, processor, memory, and storage. Similarly, the second client includes a second display 421, a second application program 424 (e.g., second browser application program), a pointing device, processor, memory, and storage. The clients execute executable code (or computer-readable code) that embodies a technique or algorithm as described in this application. The browser is an application program that can request, receive, and process data from a user, the server, or both. The data can be shown via the first display.

While computers are shown and described as an exemplary client in FIGS. 1 through 4, clients or client device may be other personal electronic device such as a notebook computer, a PDA, a cellular phone, a smartphone, and others. For example, client 403 may be a computer whereas client 406 is a smartphone in FIG. 4. In another example, both client 403 and 406 may be smartphones. The smartphone may have a touch screen. In yet another example, client 403 may be a notebook computer and client 405 may be a PDA. Like computers, other client devices, such as a smartphone (e.g., Apple iPhone, Android phone, and others), may include a display, an application program, a point device, processor, memory, and storage.

The server includes components similar to the components shown in FIG. 3 and described above. For example, the server includes a processor, memory, applications 427, and storage 430. In a specific implementation, the storage includes e-learning course content 433, Web content 436, voice recordings 439, and databases 442. The e-learning course content is optional and is not included in other implementations.

An application such as a Web server 445 delivers Web contents (or Web pages) and other data from the storage to the browsers. An example of a Web server includes the Apache Web server from the Apache Software Foundation. In a specific implementation, the applications include an e-learning application or system 448. The e-learning application interacts with the e-learning course content to provide an e-learning or on-line learning experience for individual users. Various implementations of the e-learning application and e-learning course content are described in U.S. patent application Ser. No. 11/160,098, filed Jun. 8, 2005, and Ser. No. 11/164,726, filed Dec. 2, 2005, which are incorporated by reference along with all other references cited in this application.

Figure 5:
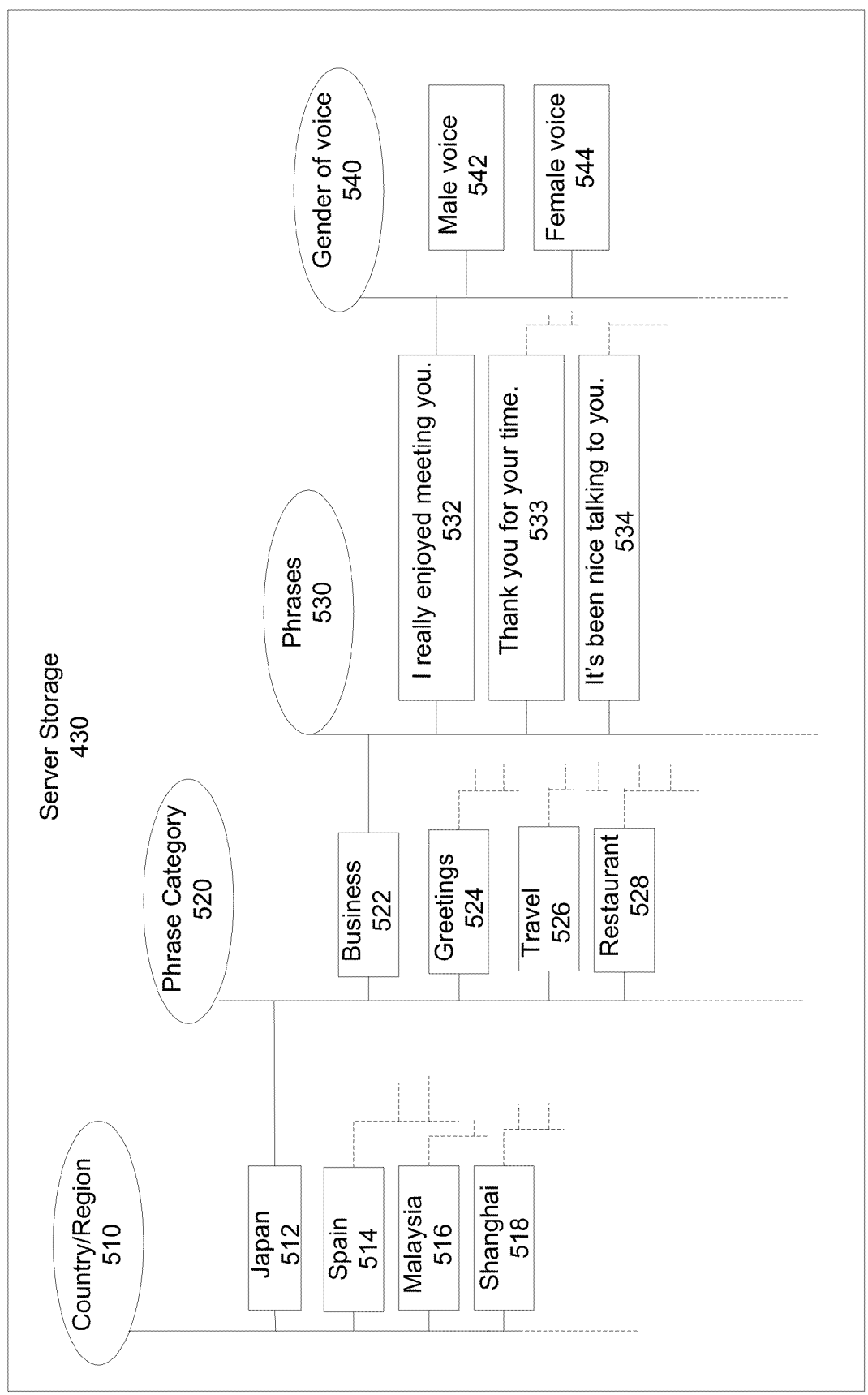
FIG. 5 shows a block diagram of a specific implementation of a server storage of the invention.

FIG. 5 shows a specific implementation of a data structure for some of the information stored in the storage of the server shown in FIG. 4. Server storage 430 includes a list of phrases and audio data representing voice recordings associated with each of the phrases. Shown in FIG. 5 is one example of a data structure for a particular language, e.g., English. The server storage may contain a separate set of data structure for other languages (e.g., Spanish, Japanese, Mandarin, and others). The data storage structure shown in FIG. 5 is merely an example, and other variations of data storage structures suitable for use are also within the scope of the present invention.

Each audio data file (representing voice recording) may be initially categorized based on a region or country 510 from which a user (i.e., a speaker who provides a voice recording) is from or is native of For example, the user may be from Japan, Spain, Malaysia, Shanghai, or other regions. The users from different regions in the world provide their own voice recordings of common English phrases with their unique accent. The voice recordings of Japanese users who speak English with Japanese accent may be stored in a file 512; the voice recordings of Spanish users who speak English with Spanish accent may be stored in a file 514; the voice recordings of Malaysian users who speak English with Malaysian accent may be stored in a file 516; the voice recordings of Shanghai users who speak English with Shanghai accent may be stored in a file 518; and so forth.

Then, voice recordings of the users from a particular region are grouped into category of phrases 520. The categories may be based on situations that the user may encounter. These include, for example, categories of phrases that the user may use in a business setting 522, in greeting others 524, during travel 526, at restaurants 528, and so forth.

Under each category of phrases, there is a list of phrases 530 that are commonly used in a particular setting. For example, under the category of business phrases 522, the following list of phrases may be stored:

"I really enjoyed meeting you." (532)
"Thank you for your time." (533)
"It's been nice talking to you." (534); and so forth.

As another illustration, the following list of phrases may be stored under the category of travel:

"What time is the train leaving?"
"The train is delayed by one hour."
"Where is a restroom?"
"The train from Tokyo is arriving in ten minutes."

For each phrase, a voice recording of the phrase by the user can be categorized based on the gender of the user 540 as shown in FIG. 5. Each voice recording of a phrase may be tagged whether the voice recording is provided by a male or a female. Separately categorizing the voice recordings based on the gender allows another user to select either a male voice or a female voice to listen to a phrase.

Furthermore, for the same phrase, a number of different voice recordings may be provided by different users. For example, multiple users can provide a recording of "I really enjoyed meeting you." This allows another user who wishes to listen to a region-specific pronunciation of the phrase to select and listen to voice recordings from a number of different individuals. This will assist a listener to determine similarities in the speech pattern for the region.

In a specific implementation, each voice recording may be tagged with an ID (i.e., an identity, contact information, or both) of the user who provided the voice recording. If desired, another user (e.g., a listener) may contact the person who provided voice recordings for various purposes. For example, the user may wish to contact the person who provided the recording for recommendations of local restaurants in the region or to receive guidance for local etiquettes or manners during travel.

Figure 6:
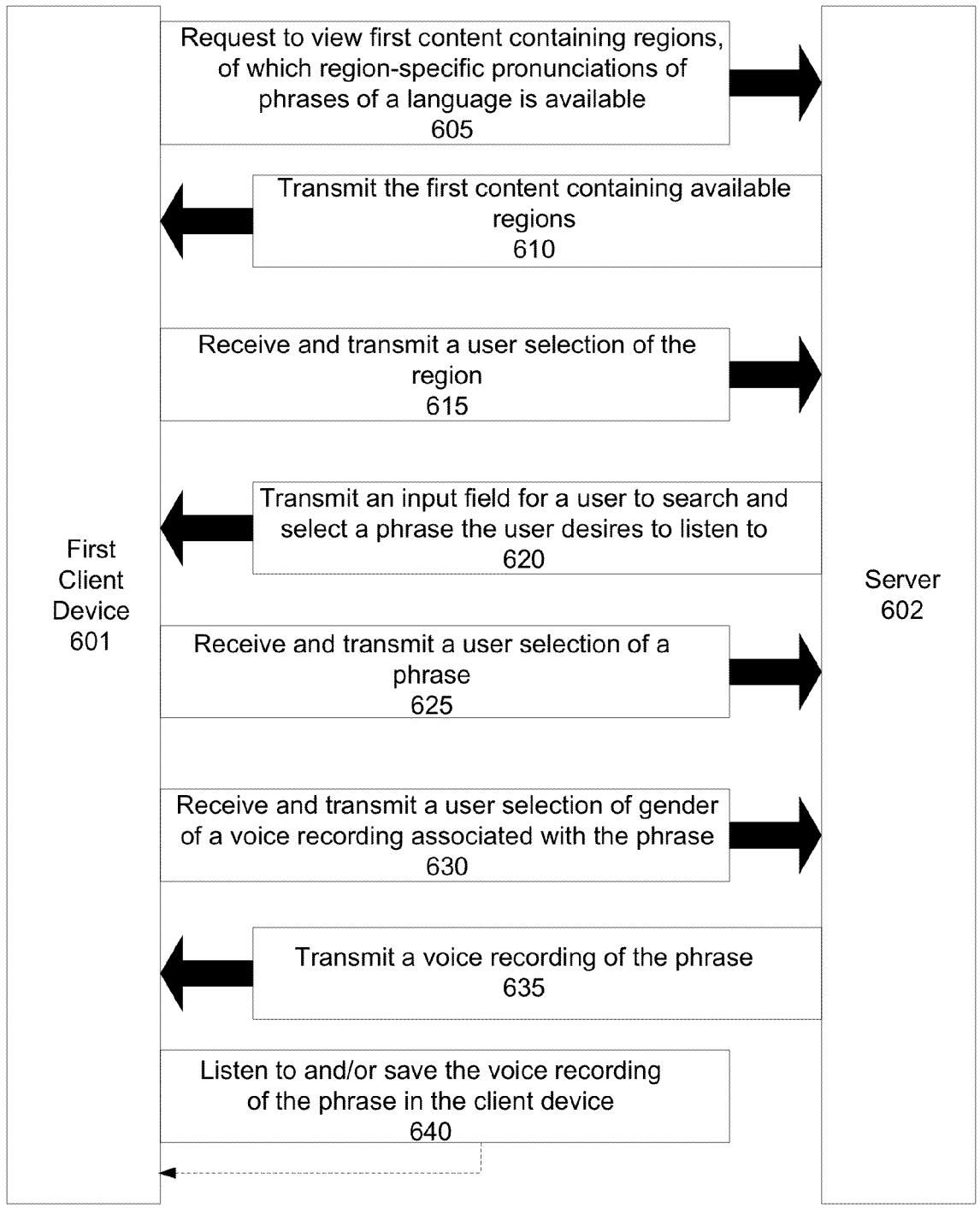
FIG. 6 shows a flow diagram for transmitting information between a client device and a server to obtain region-specific pronunciations of phrases of a language.

FIG. 6 shows a flow diagram for transmitting and receiving information between a first client device 601 and a server 602 to retrieve and listen to a specific voice recording stored in the server by a user at the first client device. The steps described below are exemplary, and some of the steps may be combined with other steps into a single step.

In a step 605, the first client device transmits a request to a server to view first content containing regions of the world, of which region-specific pronunciations of phrases of a language is available in server 602. For example, the language may be English, and available regions may be Japan, Spain, Malaysia, Shanghai and others. In other words, the server storage may include audio data for voice recordings of English phrases provided by individuals from Japan, Spain, Malaysia, Shanghai and others.

In a step 610, the server transmits to the first client device the first content which contains the regions from which region-specific pronunciations of phrases of the language is available. The regions may be countries, such as Japan, France, Italy, Spain, Germany, China, Malaysia, Korea, India, and others where English is not their primary language. The regions may also be countries, where English is the primary language, such as United States of America, Britain, Australia, Canada, New Zealand, and others. Furthermore, the regions may be locations within a country or pockets of geographical areas. For example, the regions may include Shanghai, Beijing, Tennessee, Texas, and others.

Figure 8B:
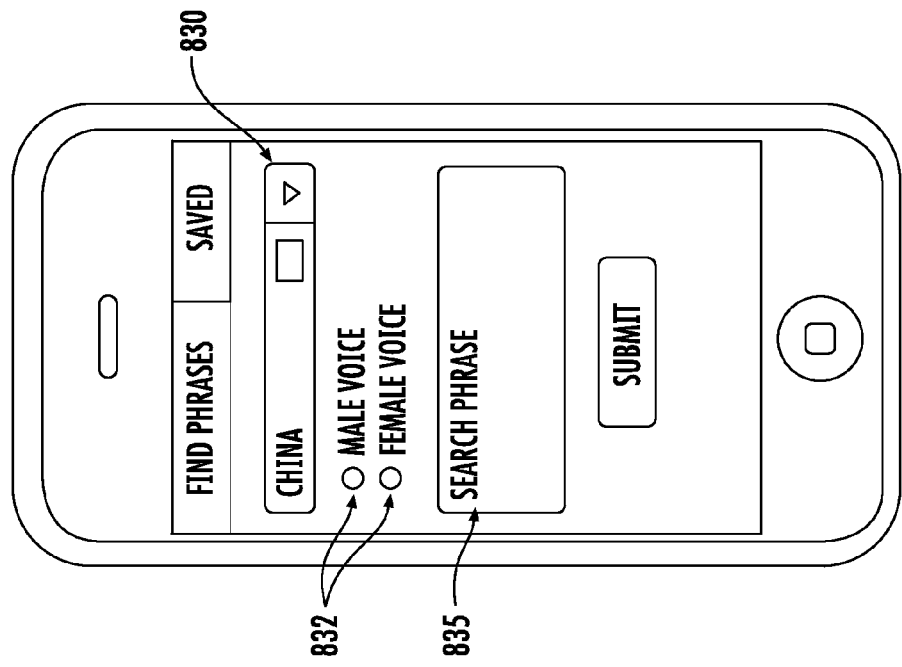
FIG. 8B shows a smartphone with a display screen showing a list for a user to select a region for listening to region-specific pronunciations of phrases.

In a step 615, the first client device receives a user selection of the region from which a user at the first client device desires to listen to the region-specific pronunciations of phrases. For example, as shown in FIG. 8B, the user may select China as a region, and the first client device (which may be a computer or a smartphone) may receive China as the user input. The user selection of the region is then transmitted to the server.

In a step 620, the server transmits to the first client device an input field for the user at the first client device to search and select a phrase that the user desires to listen to in the region-specific pronunciation. The user may input (e.g., type) keywords or category of phrases that the user desires to listen. Alternatively, the input field may include a menu which has preset categories of common phrases that the user can select from. The categories may include, for example, common phrases used at a restaurant, during travel, in a business meeting, greetings, and others.

While step 620 is shown as a separate step in FIG. 6, this step may be combined with step 610. In other words, the server may transmit, for example, a Web page which contains both an input field (or a selection drop menu) for regions and an input field for phrases that the user desires to listen.

In a step 625, the user selects a keyword or category of phrases that the user desires to listen. The first client device receives the user input, and then transmits the user input to the server. While step 625 is shown as a separate step in FIG. 6, this step may be combined with step 615. In other words, the user can transmit a Web page which contains the user's selection of a region as well as the category or keywords of common phrases the user desires to listen.

Figure 8A:
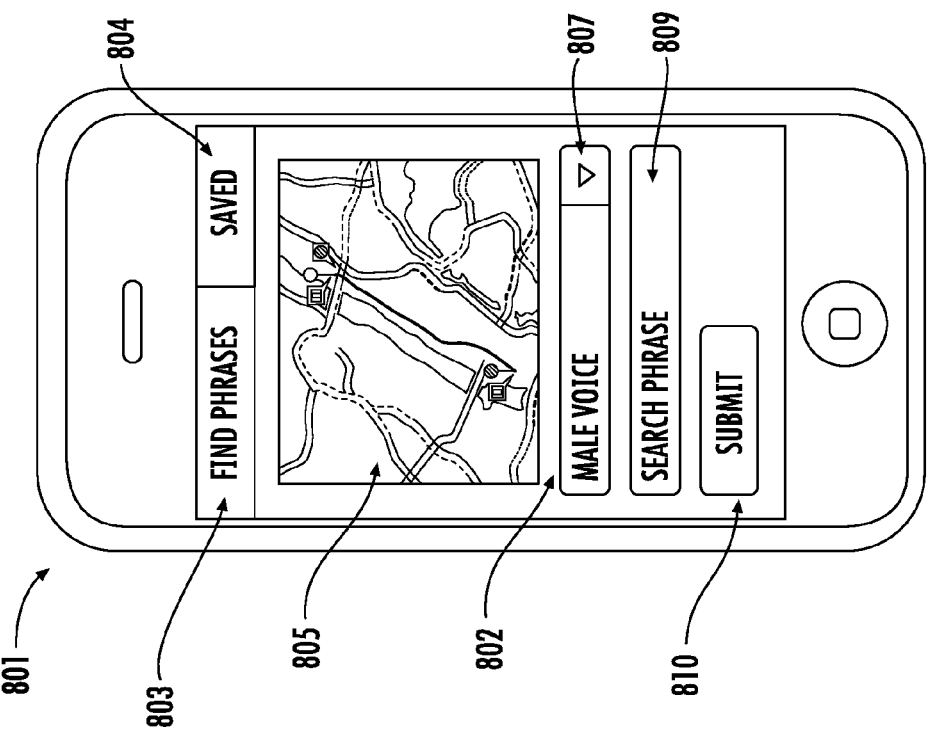
FIG. 8A shows a smartphone with a display screen showing a map for a user to select a region for listening to region-specific pronunciations of phrases.

In a step 630, the first client device receives the user selection of gender for voice recordings for the phrases that the user desires to listen to. In other words, the user can select either male voice or female voice for selected phrases as shown in FIGS. 8A and 8B. This information is transmitted to the server in step 630. While step 630 is shown as a separate step in FIG. 6, this step may be combined with step 615 or 625. Alternatively, all three steps may be combined. In other words, the user can select a region, a phrase, and a gender of voice recordings in a single Web page and transmit all the user inputs to the server in a single transmission.

In a step 635, the server transmits to the first client device a voice recording of a phrase which is selected by the user. For example, if the user selected how business phrases are spoken in China, in male voice, the server may transmit content which has a set of business phrases. Examples of business phrases may be as follows. "It was nice to meet you." "I look forward to working with you."

In a step 640, if desired, the user may optionally save audio files representing voice recordings transmitted to the first client device in the memory of the first client device. This allows the user to listen to voice recordings without having to connect to the server. This feature allows the user to listen to audio files anywhere, even in areas which lack a communication network.

Figure 7:
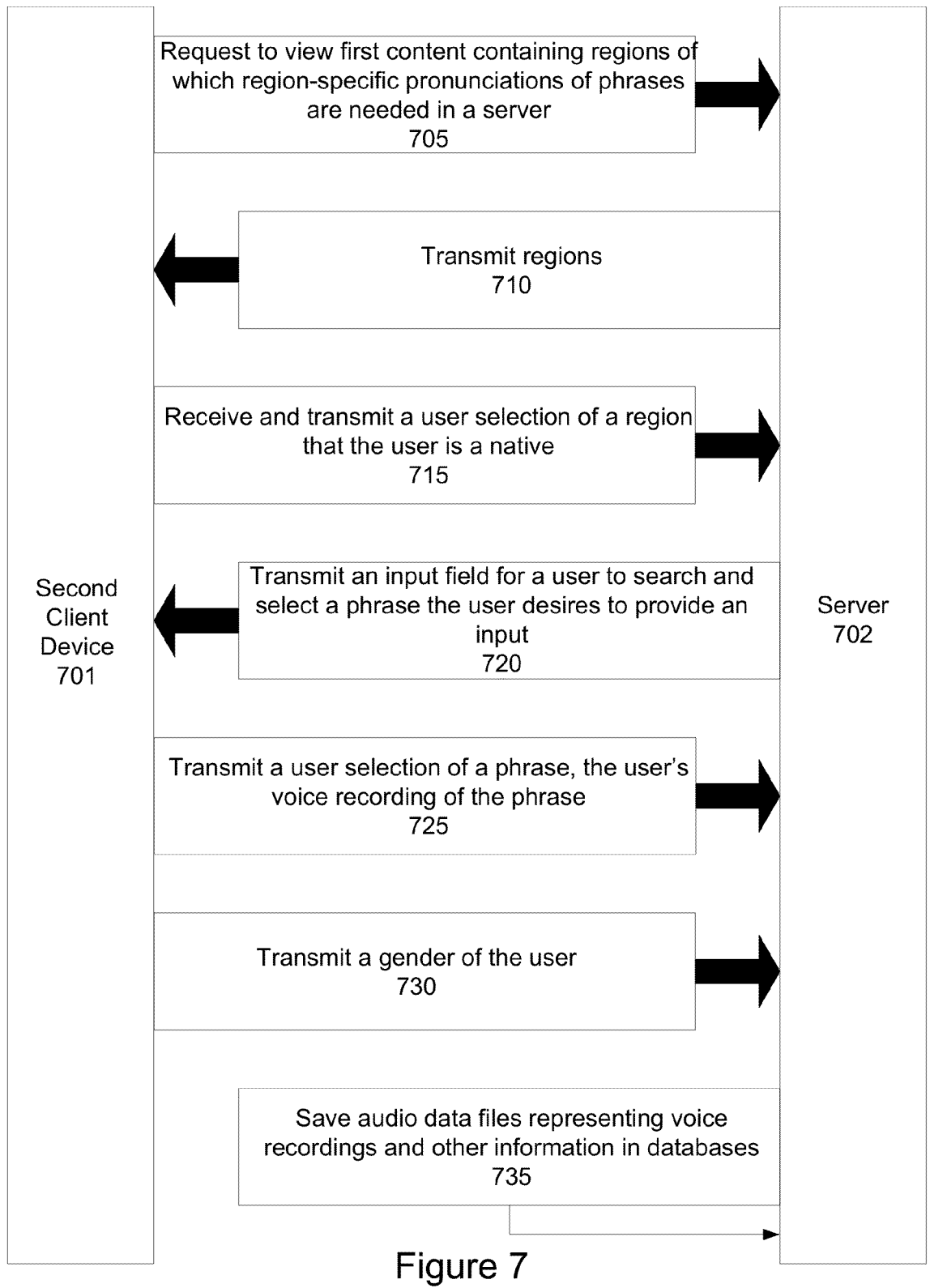
FIG. 7 shows another flow diagram for transmitting information between a client device and a server to provide region-specific pronunciations of phrases of a language.

FIG. 7 shows a flow diagram for transmitting and receiving information between a second client device 701 and a server 702. A user at the second client device may desire to provide the user's voice recording of phrases in region-specific pronunciations. For example, the user is a native of Shanghai and wishes to provide his or her accented voice recordings of common phrases in English. The user can record his or her pronunciations of English phrases and can transmit audio data files representing his or her voice recordings to the server. The server can store the audio data files in appropriate databases in the server storage.

In a step 705, the second client device sends to a request to the server to view first content. The first content contains regions where the server wants to add region-specific pronunciations of phrases of a language (e.g., English) in its databases. For example, as China and other Asian countries become major economic players, more business people may desire to hear English phrases with Chinese accents. This may provide business people better comprehension and confidence when conducting business in China. Therefore, the server may provide a list of regions where it desires to obtain region-specific pronunciations of phrases.

In a step 710, the server transmits the first content which contains regions of the world. The first content may be in the form of a map. For example, it can be a world map where the user can select a particular region from the map. Alternatively, the first content can be presented in the form of a list (e.g., a drop-down menu).

In a step 715, a user at the second client device selects a region where the user is a native. For example, the user may be born in Shanghai and may wish to provide his or her voice recordings of English phrases with Shanghai accent. The second client device receives the user selection of the region and transmits this data to the server.

In a step 720, the server transmits an input field to the second client device for the user to search and select a phrase that the user desires to provide his or her own voice recording. The input field may allow the user to input keywords or search for suitable category of phrases. Alternatively, there may be a drop-down menu for the user to select certain categories of phrases.

In a step 725, the user searches for certain phrases or selects categories of phrases that the user desires to provide his or her voice recordings of the phrases. If the user wishes to contribute his or her voice recordings, but do not find phrases from the content provided by the server, the user can input her own phrases that are commonly used in the region. For example, when a restroom is referred to as a washroom in the region, the user may input a new phrase (e.g., "Where is a washroom?") and his or her voice recording of the phrase. The audio data files representing the user's voice recordings are then transmitted to the server.

In a step 730, the second device may receive an input from a user regarding the gender of the user as well as other identifying information regarding the user. This information may be transmitted to the server. For example, the user who is providing voice recordings is a male. The user may also provide contact information including e-mail address or phone number.

In a step 735, the audio data files representing the user's voice recordings, the gender of the user, the user's native region, and other contact information may be saved in the server. If desired, the server may transform the audio data files, e.g., by removing background noise or normalize and standardize the volume of all audio data files prior to saving them in the storage.

Figure 8C:
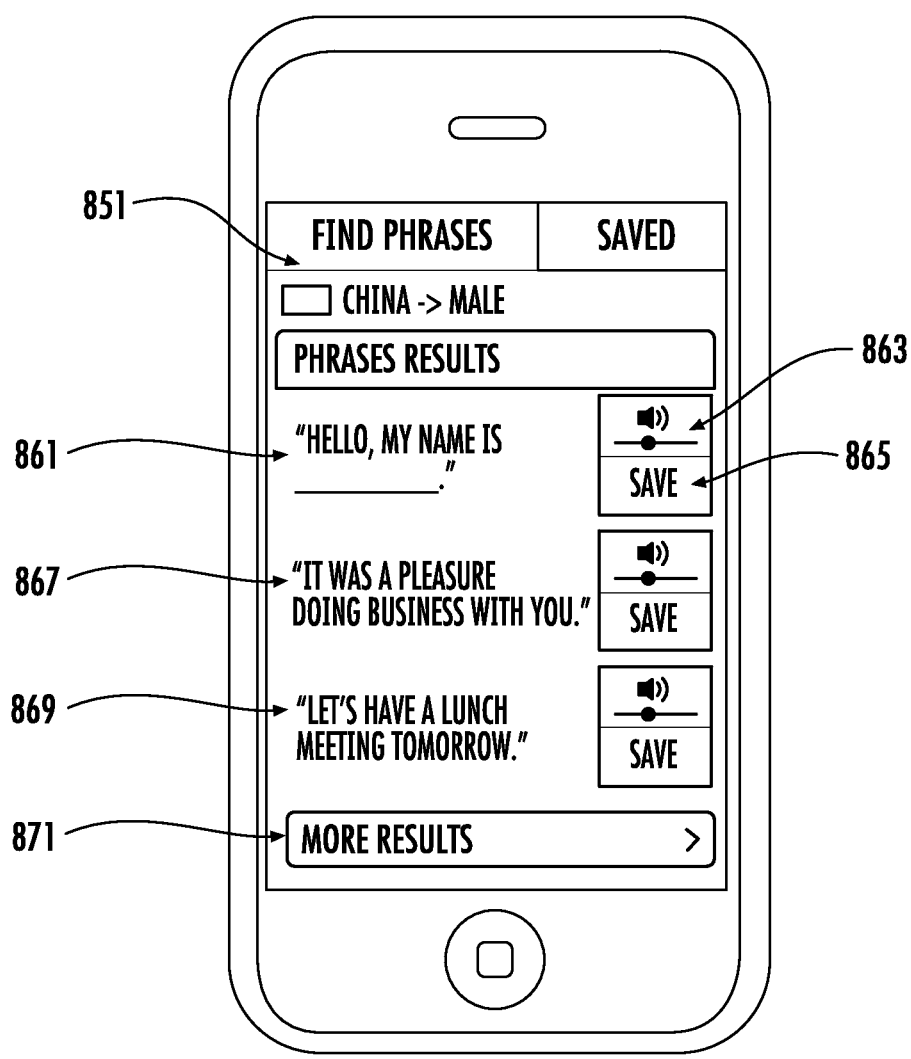
FIG. 8C shows a smartphone with a display screen showing results of a phrase search.

FIGS. 8A through 8C show an example of how a smartphone can be used as a client device in embodiments of the invention. As shown in FIG. 8A, a screen display 802 of the smartphone allows the user to either find phrases (via "Find Phrases" tab 803) when connected to a server or to find voice recordings that are already downloaded and saved in the memory of the smartphone (via "Saved" tab 804). Touching the "Find Phrases" tab allows a user to select a region and how a phrase is spoken in the region by natives of the region. After retrieving the phrase that the user desires to hear, an audio data file representing a voice recording of the phrase can be downloaded and saved onto the smartphone. The saved audio data files can be later retrieved by touching the "Saved" tab.

FIG. 8A also shows a display of a map 805 from which the user can select a location from which the user desires to listen to a region-specific pronunciation of a language. For example, the screen may display a map of the world from which the user can select a specific region from which the user desires to listen to the region-specific pronunciations of common phrases in, e.g., English. The region may be a country (e.g., China) or a specific region or location of a country (e.g., Shanghai).

In the display shown in FIG. 8A, the user can also select the gender of voice recordings from a drop-down menu 807 which may toggle between male voice and female voice. In an input field 809, the user can input a category or keyword of phrases that the user desires to listen to. Finally, the user can touch a "Submit" button 810 to transmit the input provided by the user to the server to retrieve a phrase or phrases that the user desires to listen.

FIG. 8B shows another embodiment of a screen display. Rather than showing regions of the world in the form of a map as shown in FIG. 8A, the smartphone can display regions in the form of a list in a drop-down menu 830 as shown in FIG. 8B. The user can touch an arrow in the menu to search for regions from which the user desires to listen to region-specific pronunciation of English. In FIG. 8B, China is selected as a region.

In the display shown in FIG. 8B, the user can also select male voice or female voice by touching one of the selection circles 832 (where only one of the circles can be selected at a time—an exclusive OR). The user can also input a category or keyword of phrases that the user desires to listen to in an input field or text box 835. Text can be input using a pop-up keyboard, voice-to-text input (e.g., voice recognition), wireless keyboard, pointer, or other input device or input technique. For example, the user may type in "business" in the input field to obtain a list of phrases which may be used in a business setting and to listen to voice recordings associated with the phrases. Finally, the user can touch a "Submit" button to transmit the input provided by the user to the server to retrieve a phrase or phrases that the user desires to listen.

FIG. 8C shows a screen with the results of the search transmitted from the server. As indicated by a tab 851 near the top of the display, the search results include voice recordings of male users (i.e., speakers) from China. The display shows a list of common phrases which are typically used in a business setting. A first phrase 861, "Hello, my name is _____," is a common way that people introduce themselves in English. The user can touch the screen area displaying phrase 861 to listen to a voice recording of a Chinese male speaking this English phrase. The audio can be streamed to the smartphone for playback on the speaker or earpiece. The volume of the voice recording can be controlled using a slider 863. The audio data file representing the voice recording may also be downloaded and saved in the smartphone using a "Save" tab 865. The saved file may be played back by the user, without needing to be connected to the network. The smartphone also shows two additional phrases 867 and 869 that the user may choose to play back. These phrases are related to the searched for phrase. The user can further browse additional search results by touching a "More Results" tab 871.

Figure 9:
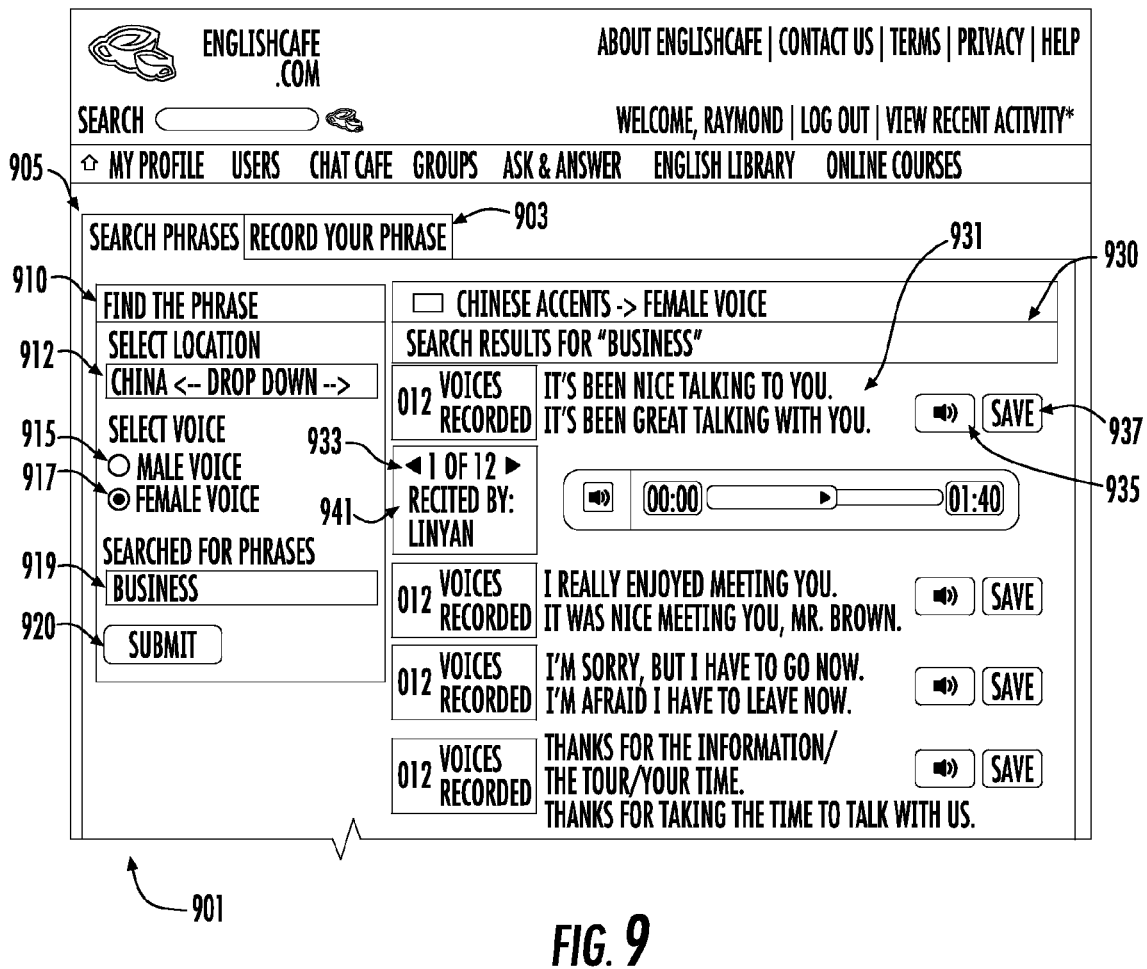
FIG. 9 shows a browser display of EnglishCafe Web site showing search results of common business phrases and voice recordings associated with the phrases.

FIG. 9 shows another example of how aspects of the invention can be applied using a Web site. The site may be accessed using a Web browser application program. As shown in FIG. 9, specific aspects of the invention are implemented at a Web site known as EnglishCafe. EnglishCafe serves a community focused on English learning. EnglishCafe may be associated with an e-learning site (e.g., GlobalEnglish) that has on-line courses for teachings students English. Each student at the e-learning site may be given the opportunity to join the EnglishCafe community site, where each student can create their own pages for others to view. Community members need not necessarily be teachers or users associated with the e-learning site.

In a specific implementation, an EnglishCafe user can log onto the Web site, and be connected to the EnglishCafe server which provides two options for the user as shown in FIG. 9. The user can select "Record your phrase" tab 903 on the Web page with a pointer device to provide his or her voice recordings. Alternatively, the user can use the Web site to search and listen to region-specific pronunciations of common phrases by selecting a "Search phrases" tab 905.

On Web page 901 shown in FIG. 9, "Search Phrases" 905 tab is selected, and the user can select parameters desired in a "Find the Phrase" box 910. In box 910, the user can select a location (i.e., a region) from a drop-down menu 912. The user can also select either male voice 915 or female voice 917. The user can type in a keyword or category in a search box 919 to search for phrases that the user desires to listen. Finally, the user can point and click a "Submit" button 920 to transmit the selected information to the EnglishCafe Web server storage to initiate the search.

After the search, the server transmits the search results and displays them on Web page 901. The search results may be shown in a separate, search result box 930 on the Web page, as shown in FIG. 9. The search results are based on the user input of China as a region, female for voice recording, and business as a category of phrases.

The search result box shows eight sets of phrases, where each set of phrases include twelve voice recordings. For a first phrase box 931, two phrases which have similar meaning are displayed—"It's been nice talking to you"; "It's been great talking with you." The user can select and hear all twelve voice recordings, if desired, by selecting arrows 933. The volume of voice recordings can be controlled by a speaker volume button 935. The phrases and voice recordings associated with the phrases can be downloaded onto a client device (e.g., a notebook or desktop computer) using a "Save" button 937.

For some voice recordings, the Web page may provide a name of the speaker who provided a voice recording of a phrase in an ID box 941. If desired, the user can select the ID box to determine if the speaker has provided his or her contact information (e.g., phone number, e-mail address, EnglishCafe member ID and others). The user may wish to contact the speaker to ask various questions about local culture, etiquette, or recommendations for local restaurants or attractions.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:

receiving a request from a client device at a server by a user to view first content containing a first list regions of the world, wherein the first list of the viewed first content contains regions of the world corresponding to a selected language in a language database, accessible by the client device via the server, and the language database includes a plurality of regions of the world and each region of the world corresponds to at least one language, and at least one user-provided voice recording in the at least one language;

based on the viewed first content containing regions of the world, determining for each region of the world at least one user-provided voice recording in the selected language;

transmitting from the server to the client device the first content containing the first list of regions of which region-specific pronunciations of phrases of the selected language is available;

after transmitting from the server to the client device the first content, receiving a request from the client device at the server to view second content containing a list of phrases and voice recordings associated with each of the phrases, for a region selected by the user at the client device; and after the receiving the request from the client device at the server to view second content, transmitting to the client device from the server the second content containing the list of phrases and voice recordings associated with each of the phrases, for the region selected by the user.

2. The method of claim 1 wherein the first content contains the regions in the form of a map or a list.

3. The method of claim 1 wherein the first content further comprises an input field which allows the user to input and search a phrase that the user desires to listen to.

4. The method of claim 1 wherein the selected language is English.

5. The method of claim 1 wherein the region are countries where their primary language is not English.

6. The method of claim 1 wherein the voice recordings include either a male voice or a female voice.

7. A system comprising:

a data memory operable to store data to be processed;

an instruction memory storing processor implementable instructions; and a processor operable to read and process the data in accordance with instructions stored in the instruction memory, wherein the instructions stored in the instruction memory comprise instructions for controlling the processor to perform the method of claim 1.

8. The method of claim 1 wherein the receiving the request from the client device further comprises:
   transmitting to the client device from the server a list including a plurality of languages;
   allowing the user to select from the plurality of languages the selected language at the client device; and
   receiving the selected language at the server.

9. The method of claim 1 wherein the language database includes a plurality of voice recordings organized according to at least one phrase identifier, the at least one phrase identifier organized according to at least one phrase category identifier, and the at least one phrase category identifier organized according to at least one region identifier.

10. The method of claim 1 wherein the language database includes for a phrase of the list of phrases, a first region corresponds to more voice recordings than a second region.

11. A method comprising:
   receiving at a client device from a server first content containing regions of the world and a selected language;
   receiving at the server from the client device a user selection of a region from the regions of the world that the user desires to listen to the region-specific pronunciations of phrases of a language, wherein the server determines that the regions of the regions of the world include at least one voice recording in the selected language;
   transmitting from the client device to the server the region selected by the user;
   receiving at the client device from the server second content containing a list of phrases and voice recordings corresponding to each of the phrases, wherein the voice recordings contain the region-specific pronunciations of the phrases of the region selected by the user; and
   generating a first output of a first voice recording of a phrase selected by the user from the list of phrases.

12. The method of claim 11 wherein the region is a country where its primary language is not English.

13. The method of claim 11 wherein the client device is a smartphone, a PDA, or a portable computer.

14. The method of claim 11 further comprising storing the voice recording of the phrase selected by the user in the client device.

15. The method of claim 11 further comprising:
   generating a second output of a second voice recording of the phrase selected by the user from the list of phrases, without receiving at the client device from the server third content containing a list of phrases and voice recordings corresponding to each of the phrases.

16. A method comprising:
   receiving at a first client device from a server first content containing regions of the world;
   receiving at the first client device from the server second content containing a list of phrases, each phrase of the list of phrases corresponding to at least one phrase category, of which region-specific pronunciations of the phrases of the language is desired in the server;
   receiving from a first user at the first client device a user selection of a region that the first user desires to provide the region-specific pronunciations of the phrases;
   receiving at the first client device a user selection of a phrase category based on the user selected region that the user desires to provide the region-specific pronunciations of the phrases;
   receiving at the first client device a user selection of a phrase and the first user's voice recording of a phrase in the region-specific pronunciation;
   transmitting from the first client device to the server the user selection of the phrase, the first user's voice recording of the phrase, the phrase category, and the region from which the first user is a native of;
   receiving at a second client device from the server third content containing regions of the world and a selected language;
   receiving at the server from the second client device a second user's user selection of a region from the regions of the world that the second user desires to listen to the region-specific pronunciations of phrases of a language, wherein the server determines that the regions of the regions of the world include at least one voice recording in the selected language;
   transmitting from the second client device to the server the region selected by the second user;
   receiving at the second client device from the server fourth content containing a list of phrases and voice recordings corresponding to each of the phrases, wherein the voice recordings contain the region-specific pronunciations of the phrases of the region selected by the second user and includes the first user's voice recording; and
   generating an output of the first user's voice recording selected by the second user from the list of phrases.

17. The method of claim 16 wherein the region is a country where its primary language is not English.

18. The method of claim 16 wherein the user is not a native English speaker.

19. A nontransitory computer readable medium comprising computer readable program code embodied in the medium, the computer readable program code causing a processor to perform the method of claim 16.

20. The method of claim 16 wherein the phrase category corresponds to situations a user may encounter.

21. The method of claim 16 wherein the phrase category is a business phrase category.

22. The method of claim 16 wherein the user selected phrase exists before the user selects the phrase.

23. A method comprising:
   receiving a request from a client device at a server to view first content containing regions of the world comprising:
   for a first region of the regions of the world, determining to include in the viewed first content the first region when the first region includes at least one voice recording in a language; and
   determining to exclude from the viewed first content the first region when the first region does not include at least one voice recording in the language;
   receiving a request from the client device at the server to view second content containing a list of phrases of which region-specific pronunciations of the phrases of the language is desired in the server;
   transmitting from the server to the client device the first content containing the regions of the world;
   transmitting from the server to the client device the second content containing the list of phrases of which region-specific pronunciations of the phrases of the language is desired in the server; and
   receiving at the server from the client device a user selection of a phrase, the user's voice recording of the phrase, and the region from which the user is a native of.

24. The method of claim 23 wherein the language is English.

25. A system comprising:
   a data memory operable to store data to be processed;
   an instruction memory storing processor implementable instructions; and a processor operable to read and process the data in accordance with instructions stored in the instruction memory, wherein the instructions stored in the instruction memory comprise instructions for controlling the processor to perform the method of claim 24.

26. The method of claim 23 wherein the user is not a native English speaker.

27. The method of claim 23 wherein the regions countries where their primary language is not English.

28. A client device comprising a computer readable medium comprising computer readable program code embodied in the medium, the computer readable program code causing a processor to perform a method comprising:

receiving at a first client device from a server first content containing regions of the world;

receiving at the first client device from the server second content containing a list of phrases, each phrase of the list of phrases corresponding to at least one phrase category, of which region-specific pronunciations of the phrases of the language is desired in the server;

receiving from a first user at the first client device a user selection of a region that the first user desires to provide the region-specific pronunciations of the phrases;

receiving at the first client device a user selection of a phrase category based on the user selected region that the user desires to provide the region-specific pronunciations of the phrases;

receiving at the first client device a user selection of a phrase and the first user's voice recording of a phrase in the region-specific pronunciation;

transmitting from the first client device to the server the user selection of the phrase, the first user's voice recording of the phrase, the phrase category, and the region from which the first user is a native of;

receiving at a second client device from the server third content containing regions of the world and a selected language;

receiving at the server from the second client device a second user's user selection of a region from the regions of the world that the second user desires to listen to the region-specific pronunciations of phrases of a language, wherein the server determines that the regions of the regions of the world include at least one voice recording in the selected language;

transmitting from the second client device to the server the region selected by the second user;

receiving at the second client device from the server fourth content containing a list of phrases and voice recordings corresponding to each of the phrases, wherein the voice recordings contain the region-specific pronunciations of the phrases of the region selected by the second user and includes the first user's voice recording; and generating an output of the first user's voice recording selected by the second user from the list of phrases.

\* \* \* \* \*